UNITED STATES PATENT OFFICE.

EDMOND QUERU, OF NEW YORK, N. Y.

IMPROVEMENT IN GELATINIZING OILS.

Specification forming part of Letters Patent No. 25,277, dated August 30, 1859.

*To all whom it may concern:*

Be it known that I, EDMOND QUERU, of the city, county, and State of New York, have discovered a Mode of Jellifying Castor-Oil. No method has ever been heretofore discovered or invented by which castor-oil can be jellified; and I do hereby declare that the following is a full and exact description thereof, reference being had to the specimens of ingredients and of the article itself forwarded herewith.

I take of white refined sugar one pound and three-quarters, (1 lb 12 ℥,) and boil the same with ordinary water until it becomes a concentrated or thick sirup. I take of isinglass (Russian, Prussian, Brazilian, or Cooper's) three ounces and a half, (3 ℥ 4 ʒ,) which I put in a warm-water bath with five ounces (5 ℥) of ordinary water. When well dissolved, I pour in the sirup, very warm, and stir the whole constantly until it is thoroughly mixed together. I then take one pound (1 lb) of this mixture and put it in a clean warm-water bath and place the same on the fire. When the water is nearly boiling, I add, by small quantities at a time, three pounds and a half (3 lb 8 ℥) of fine castor-oil, constantly stirring with the spatula until thoroughly mixed together. I may add a few drops of essential oil of cloves or cinnamon, or any other aroma to disguise the taste of the castor-oil. The benefit of this discovery is that it renders the castor-oil more easily to be taken, while leaving its useful qualities as a medicine entirely unimpaired. In many cases when castor-oil is prescribed for the sick they are unable to take it, on account of the difficulty of swallowing so greasy a substance. The jellification destroys its greasiness and makes it palatable.

What I claim as my discovery, and desire to secure by Letters Patent, is—

The jellification of castor-oil by means of the process hereinbefore described.

EDMOND QUERU.

Witnesses:
 WM. HENRY FORMAN,
 AUGUSTUS A. ROBINSON.